US012610201B2

(12) United States Patent
Merkl et al.

(10) Patent No.: US 12,610,201 B2
(45) Date of Patent: Apr. 21, 2026

(54) HEARING DEVICE

(71) Applicant: Sivantos Pte. Ltd., Singapore (SG)

(72) Inventors: Tobias Merkl, Erlangen (DE); Benjamin Schmidt, Singapore (SG); Nishshanka Bandara Narampanawe, Singapore (SG); Heng Goh Yap, Singapore (SG); Chee Kong Siew, Singapore (SG)

(73) Assignee: Sivantos Pte. Ltd., Singapore (SG)

( * ) Notice: Subject to any disclaimer, the term of this patent is extended or adjusted under 35 U.S.C. 154(b) by 161 days.

(21) Appl. No.: 18/591,277

(22) Filed: Feb. 29, 2024

(65) Prior Publication Data

US 2024/0205616 A1 Jun. 20, 2024

Related U.S. Application Data

(63) Continuation of application No. PCT/EP2022/074062, filed on Aug. 30, 2022.

(30) Foreign Application Priority Data

Aug. 30, 2021 (SG) ............................ 10202109499T

(51) Int. Cl.
*H04R 25/00* (2006.01)

(52) U.S. Cl.
CPC ........... *H04R 25/55* (2013.01); *H04R 25/609* (2019.05); *H04R 25/65* (2013.01); *H04R 2225/023* (2013.01); *H04R 2225/025* (2013.01); *H04R 2225/31* (2013.01); *H04R 2225/57* (2019.05)

(58) Field of Classification Search
CPC ...... H04R 25/55; H04R 25/609; H04R 25/65; H04R 2225/023; H04R 2225/025; H04R 2225/31
See application file for complete search history.

(56) References Cited

U.S. PATENT DOCUMENTS

| | | | |
|---|---|---|---|
| 8,682,016 B2 | 3/2014 | Wagner et al. | |
| 2018/0054682 A1* | 2/2018 | Shenoy ................ | H04R 1/1016 |
| 2021/0152951 A1 | 5/2021 | Wenzel et al. | |

FOREIGN PATENT DOCUMENTS

| | | |
|---|---|---|
| CN | 104067637 A | 9/2014 |
| GB | 2569536 A | 6/2019 |

* cited by examiner

*Primary Examiner* — Sunita Joshi
(74) *Attorney, Agent, or Firm* — Laurence A. Greenberg; Werner H. Stemer; Ralph E. Locher

(57) ABSTRACT

A hearing device has a motherboard and a receiver module. The receiver module is configured for wireless charging of a battery and, for that purpose, has a coil wound around an axial direction. The motherboard has a top section that extends perpendicular to the axial direction and in a radial direction. The top section of the motherboard and the receiver module are stacked in the axial direction.

14 Claims, 6 Drawing Sheets

HEARING DEVICE

CROSS-REFERENCE TO RELATED APPLICATION

This application is a continuation, under 35 U.S.C. § 120, of copending International Patent Application PCT/EP2022/074062, filed Aug. 30, 2022, which designated the United States; this application also claims the priority, under 35 U.S.C. § 119, of Singaporean Patent Application SG 10202109499T, filed Aug. 30, 2021; the prior applications are herewith incorporated by reference in their entirety.

FIELD AND BACKGROUND OF THE INVENTION

The invention concerns a hearing device.

A hearing device is generally used to output sound signals to a user of the hearing device. A particular example of a hearing device is a hearing aid, which aids a user who has a hearing deficit by compensating for the deficit. A hearing aid is in general designed to record sound signals from the environment, to process them and finally to output them in a modified (i.e., typically amplified) manner in such a way that the hearing deficit is at least partially compensated for.

In general, a hearing device is a mobile device with its own, separate power supply, e.g., in the form of a battery, which is part of the hearing device. The battery may be recharged once it is depleted. Recharging may be achieved by connecting the hearing device to a suitable power outlet. However, wireless charging is typically preferred in current and future mobile device applications. Apart from being more convenient than cable-based charging, wireless charging has the benefit of complete galvanic separation between the charger and the mobile device. Wireless charging also has aesthetic benefits, since no contact pins are exposed to the outside. Wireless charging also allows the mobile device to be charged with a somewhat higher degree of freedom of alignment relative to a charger as compared to contact-based charging, where the contacts must be correctly aligned for successful charging. This provides for greater design freedom with respect to the mechanical design of the mobile device and the corresponding charger. All these benefits are particularly useful for hearing devices, which are regularly exposed to harsh conditions while they are being worn in or around the user's ear and which may come in a variety of form factors (i.e., sizes and shapes) designed to fit various users.

In particular, hearing devices which are predominantly or completely worn inside a user's ear canal often have highly individualized shells to fit a particular user or at least several shells with different shapes are provided to offer at least some degree of individualization. In any case, such hearing devices face severe as well as variable constraints with respect to installation space, which is aggravated when adding a wireless charging capability with a corresponding receiver module.

SUMMARY OF THE INVENTION

It is accordingly an object of the invention to provide an improved hearing device which overcomes the above-mentioned disadvantages of the heretofore-known devices and methods of this general type and which provides for a hearing device in which wireless charging can be enabled and having small form factors and corresponding installation space constraints. Further objects may be derived from the following description.

With the above and other objects in view there is provided, in accordance with the invention, a hearing device, comprising:

a receiver module configured for wireless charging of a battery, said receiver module having a coil running around an axial direction;

a motherboard having a top section extending perpendicular to the axial direction and in a radial direction; and said top section and said receiver module being stacked in the axial direction.

In other words, the hearing device comprises a motherboard and a receiver module. The hearing device also comprises a battery and the receiver module is configured for wireless charging of the battery. For that purpose, the receiver module comprises a coil, which runs around, or is wound around, an axial direction. That is, the coil gas a longitudinal axis which extends in the axial direction. Therefore, the receiver module is also called "battery coil module" or simply "battery module". Wireless charging is achieved via interaction with a magnetic field, which is created by a transmitter module of a corresponding charger. The coil of the receiver module picks up the magnetic field and corresponding energy, which is then used for charging the battery. The charger is designed and oriented such that the magnetic field at the coil generally runs in the axial direction and, thus, through the coil.

The motherboard, in particular, comprises electrical and/or electronic components such as ICs, resistors, capacitors, microphones, speakers and the like to implement one or several features, such as sound recording, sound output, sound amplification, signal processing, wireless communication, charging/discharging of the battery, automatic switch-off of the hearing device and the like. The motherboard also comprises conducting elements, such as conductor paths or planes, each typically made from copper. The motherboard generally comprises a PCB (printed circuit board) on which such components are mounted and connected to each other as required via suitable conducting elements. The motherboard described here comprises a top section, which extends perpendicular to the axial direction and in a radial direction, i.e., the radial direction is perpendicular to the axial direction. The top section and the receiver module are stacked in the axial direction. As such, the top section comprises two opposing sides, one of which faces the receiver module and the other facing away from the receiver module. Components and conducting elements paths as described above may be mounted on either side.

The stacked arrangement of the motherboard and the receiver module has the advantage of being particularly compact and, thus, facilitate integration of a wireless charging capability into hearing devices with severe installation space constraints, such as ITE (in-the-ear) or CIC (completely-in-the-canal) hearing aids. Hence, the hearing device preferably is an ITE or CIC hearing aid. Such a stacked arrangement, however, is not obvious because the motherboard and its components and conducting elements potentially shield the magnetic field used for wireless charging and therefore prevent an efficient energy transfer.

In preferred embodiment, the motherboard has a side section connected to the top section and a bottom section connected to the side section. In this embodiment, the motherboard is arranged to wrap around the receiver module (and preferably also the battery) with the receiver module located between the top section and the bottom section. Thus, a sandwiched configuration (as a special case of the stacked configuration) is realized, in which the receiver module is sandwiched between top and bottom sections of the motherboard. The side section, then, extends in the axial direction and connects the top and bottom sections. The side section optionally has a center section, which connects to the top and bottom sections and a number of (preferably two) wings attached to the center section and embracing or folded around the receiver module in a circumferential direction, such that the receiver module is almost encapsulated by the motherboard.

The hearing device is generally used to output sound signals to a user of the hearing device. A particularly preferred embodiment of the hearing device is a hearing aid, which aids a user who has a hearing deficit by compensating said deficit. A hearing aid is in general designed to record sound signals from the environment, to process them and finally to output them in a modified (i.e., typically amplified) manner in such a way that the hearing deficit is at least partially compensated for. Other examples of hearing devices are headphones.

The hearing device is also called “hearing instrument”. Preferably, the hearing device comprises a customized shell, to be worn in a particular user’s ear canal. The shell, then, is an individualized component of the hearing device, fitted to a particular user. The shell also serves as a housing of the hearing device and, hence, the shape and size of the shell define the installation space available for further components of the hearing device such as the above-mentioned motherboard and receiver module. A small form factor is always a priority concern for a hearing device, especially for custom hearing devices which cover a wide range of shell shapes to be produced.

The inconsistency of shell shape from one device to another for a custom hearing device also leads to a high degree of freedom in positioning of the hearing device relative to a charger, which has corresponding consequences for wireless charging. These consequences are not present for fixed housing shapes as in BTE (behind-the-ear) or RIC (receiver-in-canal) hearing aids. A high degree of freedom in wireless charging is preferably realized by employing the magnetic resonance (MR) charging, using a receiver module for receiving magnetic energy. Aside from this wireless charging feature, further features of the hearing device may be a microphone, an acoustic amplification, a Bluetooth low energy (BLE) and/or Near Field Magnetic Induction (NFMI) communication, a charging-discharging feature, a switch-off feature, a signal processing, etc. The motherboard is the main platform for implementation of any of the aforementioned features and, hence, is configured correspondingly. The combination of a motherboard and receiver module in a stacked configuration as described here achieves a particularly small form factor and also provides a high degree of freedom for wireless charging.

Magnetic resonance (MR) charging, which is preferred here, is a wireless charging solution in which both the transmitter module and the receiver module are tuned to the same resonance frequency, at least within a certain threshold range, e.g., within 5% of the resonance frequency. Magnetic resonance charging is also contactless and features the corresponding benefits. As wireless charging in general, also magnetic resonance charging may be either inductive or capacitive, wherein inductive resonance charging is preferred here. A power transfer based on magnetic resonance charging has the benefits of a still high efficiency when the transmitter module and the receiver module are only loosely coupled. As such, magnetic resonance charging is particularly suitable for a hearing device application, i.e., for use in a hearing device, to cater to a wide range of hearing device products, potentially with different form factors, such as ITE or CIC hearing aids with individualized shells.

In addition to the coil, the receiver module preferably comprises a ferrite, for enhancing the magnetic coupling during wireless charging. The coil generally comprises one or several turns, which run around the axial direction, such that a stack of turns is formed and the coil has a helical shape, extending in the axial direction. Preferably, the turns are circular, such that the coil in general has the shape of a tube extending in the axial direction and a radius measured in the radial direction. The ferrite preferably follows the turns of the coil and, correspondingly, has a tube-like shape. The ferrite is located inside the coil, preferably such that the coil runs along an outwards facing surface of the ferrite. The ferrite and the coil are preferably positioned and fixed relative to each other with a fixing ring. The coil and ferrite are preferably configured such that the battery is located inside of these. The battery generally has a cylindrical shape, with a radius that fits inside the coil and ferrite.

Due to the stacked arrangement, the motherboard relative to battery and receiver module is located such that the magnetic field during wireless charging is potentially shielded by the motherboard. This is potentially aggravated by conducting elements (or conductors) mounted on the motherboard, in particular copper traces or planes, e.g., a ground plane. In particular, the stacked (or even sandwiched) configuration design has the disadvantages of a high reduction of the quality factor of the receiver module, constraining the magnetic field, and an inconsistency of the resonance frequency for wireless charging. The high reduction of the quality factor is the result of a reduction of inductance due to the conducting elements on the motherboard which is placed close to the receiver module. As a result, the resonance frequency of the receiver module will be shifted to a higher frequency value after the receiver module is assembled together with the motherboard and into the housing of the hearing device. Furthermore, the large reduction to the quality factor is also caused by an increment of resistance when the hearing device is immersed into the magnetic field with the generation of eddy currents over the motherboard’s conducting elements.

With respect to constraining the magnetic field, any conducting element on the motherboard (in particular in top and bottom section) and in the path of the magnetic field towards the receiver module, in particular the ferrite, is problematic. A particular disadvantage arises from any ground plane of the motherboard, said ground plane usually covering a large area of the motherboard, thereby providing substantial shielding of the magnetic field.

In the following, two solutions are presented for solving the problem of the motherboard blocking off the magnetic field towards the ferrite. Both solutions are advantageous on their own, but can also be combined.

According to the first solution, the motherboard, in particular the top section, comprises a circumference, which is designed (in particular trimmed) such that it at least partially does not extend beyond the ferrite in the radial direction and/or does not cover the ferrite when viewed in the axial direction. The motherboard, thus, has a reduced extension in the radial direction, thereby exposing the ferrite when viewed in the axial direction, which is also, in general, the direction of the magnetic field. It may be considered advantageous to design the motherboard to extend as wide as possible in the radial direction for a maximum of space to arrange components or for a simplified design and, thereby, cover the entire receiver module. However, this will also shield the ferrite from the magnetic field. Hence, one or more sections at the border of the motherboard are left out and its circumference is recessed or trimmed in the radial direction, to better expose the ferrite to the magnetic field.

According to the second solution, the motherboard comprises a ground plane, which is designed (in particular trimmed) such that it at least partially does not extend beyond the ferrite in the radial direction and/or does not cover the ferrite when viewed in the axial direction. This is based on the observation that it is not necessary to reduce the entire motherboard to allow passage of the magnetic field, but that it is already sufficient to remove any conducting elements in the path of the magnetic field. The motherboard typically comprises a board, e.g. made from FR4 or similar, on which conducting elements and other components are mounted. In particular, the motherboard comprises a ground plane, which extends over a substantial (i.e., at least 50%) area of the top section and constitutes the main obstacle for the magnetic field. Hence, this ground plane is preferably designed as mentioned to expose the ferrite, while the board itself may still cover the ferrite without any shielding.

When starting from a motherboard or ground plane which entirely covers the ferrite, a suitable embodiment is achieved by trimming the entire motherboard or at least its ground plane in the radial direction and at the edges (i.e., at the circumference), preferably as much as possible. In this approach, the motherboard's circumference and/or ground plane comprises one or more trimmed regions, which are recessed when compared to the original configuration and which have a reduced extension in the radial direction. These trimmed regions are free of any conducting material and, hence, provide free passage for the magnetic field.

While it is, in principle, desirable to expose the entire ferrite, it is already sufficient to expose a substantial amount of the ferrite, i.e., at least 50% when viewed in the axial direction. Hence, in a suitable embodiment, the circumference or ground plane is designed such that at least 50% of the ferrite remains uncovered by it (meaning the circumference or ground plane) when viewed in the axial direction.

Since the ferrite is typically tube-shaped and correspondingly ring-shaped when viewed in cross-section perpendicular to the axial direction, the trimmed regions are preferably arc-shaped. In a suitable embodiment, the circumference or ground plane is correspondingly designed such that it is formed with one or more arc-shaped (also C-shaped) recesses for exposing the ferrite when viewed in the axial direction.

The particular design of the motherboard's circumference and/or ground plane provides a significant performance enhancement of the hearing device with respect to wireless charging, since the reduction of inductance and quality factor is reduced and a smooth magnetic field flow with less shielding effect is achieved. At the same time, a still large ground plane may be retained for noise reduction. With the radially reduced circumference and/or ground plane for exposing the ferrite, the negative effect of a reduced inductance is mitigated when integrating the receiver module in a stacked configuration into a hearing device. As a result, the reduction of quality factor and inductance of the battery coil module as well as the shift of resonance frequency are also minimized. Further, the generated magnetic field from the charger can directly reach the ferrite of the receiver module and efficiently induce energy to the receiver coil for charging of the battery.

A shift of the resonance frequency after the hearing device is assembled can also be caused by an inconsistency of placement of the receiver module relative to the motherboard within the hearing device. This is particularly relevant for individualized hearing devices such as ITE and CIC hearing aids and/or hearing devices with individualized shells. In general, a gap is formed between the motherboard's top section and the receiver module, said gap usually spanning a distance on the order of 0.5 mm to 1 mm in the axial direction. This gap and distance may vary from device to device adding a corresponding inconsistency. A small gap further reduces the inductance value of the receiver module, while a large gap results in less reduction of the inductance value. With this inconsistency, the resonance frequency differs accordingly in each assembled hearing device.

Hence, in a preferred embodiment, a resonance frequency tolerance control is implemented by introducing a high precision holding frame to guarantee as little variation of the gap and distance as possible, in particular during assembly as well as during use. Correspondingly, in a suitable embodiment, the hearing device comprises a holding frame, which holds the motherboard and the receiver module and fixes them relative to each other. This prevents inconsistencies during assembly. Optionally, one or more further components of the hearing device are fixed to the holding frame. Examples of further components are an RF antenna or other antenna, a microphone or a speaker. Preferably, the holding frame is positioned entirely within a housing of the hearing device. The holding frame is preferably made from a rigid, non-conductive material. The holding frame preferably is monolithic and, hence, manufactured from only a single material and as a single piece, e.g., as a molded piece made from a plastic.

In a suitable embodiment, the holding frame has several brackets extending in the axial direction, wherein each bracket has a shoulder in which the receiver module rests and an arm on which the motherboard rests. The brackets are connected to each other, e.g., via a plate. The brackets surround and so to say grab the receiver module. The motherboard, then, is placed on top of this, such that the gap between receiver module and motherboard is defined by the positions of the arms, on which the motherboard rests. The shoulders are facing inwards, i.e., towards the receiver module. The shoulders are, e.g., formed as recesses on an inside of each bracket. The arms extend into the radial direction and inwards, such that they extend over the coil and/or ferrite.

In a preferred embodiment, the holding frame, receiver module and motherboard are designed such that during assembly the receiver module (and battery) are inserted sideways (i.e., in the radial direction) between the motherboard's top and bottom section to achieve a stacked configuration and this combination of motherboard and receiver module is inserted into the holding frame in the axial direction, such that the shoulders and arms of the brackets act as a limit stop to the axial insertion and, hence, fix the motherboard and receiver module in a particularly well defined and precise way.

As already mentioned, the brackets are preferably connected to each other by a plate. In a suitable embodiment, the holding frame comprises a corresponding plate, which is connected to each of the brackets, and the plate extends in the radial direction and is stacked with the receiver module and the motherboard's top section in the axial direction. The plate preferably has a roughly circular shape and optionally comprises one or more cut-outs to accommodate parts of the motherboard and/or to allow access to the motherboard. In particular, the plate is located at the bottom and, hence, close to the motherboard's bottom section. Preferably, the motherboard and holding frame are designed such that the motherboard's bottom section rests on the holding frame's plate, to provide further rigidity.

As already mentioned, a gap is formed between the motherboard's top section and the receiver module. The holding frame keeps the distance between the receiver module and the motherboard at a fixed value with a particularly small tolerance. In a preferred embodiment, the holding frame is designed such that the gap is set to a fixed distance (measured in the axial direction) within a tolerance of at most 0.15 mm. In other words: the distance is fixed at a particular value and with a tolerance of at most 0.15 mm. In the embodiment with a holding frame with brackets, the tolerance is the sum of a first tolerance for resting the receiver module on the shoulders and a second tolerance for resting the motherboard on the arms. The first tolerance preferably is at most 0.1 mm. The second tolerance preferably is at most 0.05 mm. The distance itself preferably is in the range of 0.5 mm to 1 mm, such that the corresponding tolerance is on the order of 15% to 30% of the distance.

By having a tolerance as small as described above, any shifting of the receiver module's resonance frequency after assembly is controllable within reasonable limits and results in a correspondingly small distribution value. Furthermore, the holding frame also prevents the hearing device from the influence of an external force, such as when dropping the hearing device to the floor, strong shaking in the event of transportation or heavy sport, etc. Such an influence could flip or shift the motherboard and result in a deviation of the resonance frequency from a target resonance frequency, which in turn could cause the hearing device not being able to be charged.

Other features which are considered as characteristic for the invention are set forth in the appended claims.

Although the invention is illustrated and described herein as embodied in a hearing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
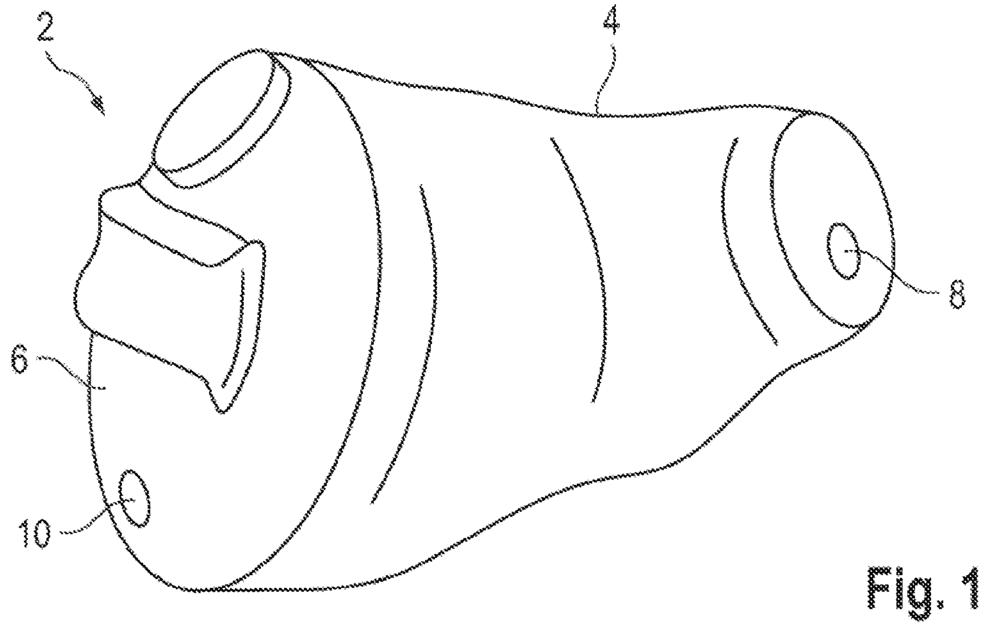
FIG. 1 is a perspective view of an exemplary hearing device.

FIG. 1 shows an exemplary embodiment of a hearing device 2. The hearing device 2 shown here is an ITE hearing device 2 comprising a customized shell 4, to be worn in a particular user's ear canal. The hearing device 2 in FIG. 2 also comprises a face plate 6, which faces outwards when worn, and a sound outlet 8, which faces inwards when worn to output sound to the user by using a speaker. Sound is input and recorded by the hearing device 2 with a microphone which is situated behind a sound inlet 10.

The hearing device 2 comprises a motherboard 12, a receiver module 14 and a battery (not shown). The receiver module 14 is configured for wireless charging of the battery and therefor comprises a coil 16, which runs around an axial direction A, i.e., around a longitudinal axis which extends in the axial direction A. Wireless charging is achieved via interaction with a magnetic field H, which is created by a transmitter module 19, e.g. with an antenna 18 (here an NFMI antenna), of a corresponding charger (not shown). The coil 16 picks up the magnetic field H and corresponding energy, which is then used for charging the battery. The charger is designed and oriented such that the magnetic field H at the coil 16 generally runs in the axial direction A and, thus, through the coil 16 (cf. simulation in FIGS. 10 and 11).

An exemplary embodiment of a combination of a motherboard 12 and receiver module 14 is shown in FIGS. 2 to 5 in various views and partially in combination with other components of the hearing device 2. The motherboard 12 comprises electrical and/or electronic components 20 such as ICs, resistors, capacitors, microphones, speakers and the like to implement one or several features. The motherboard 12 also comprises conducting elements 22 (cf. FIGS. 7, 9), such as conductor paths or planes, each typically made from copper. The motherboard 12 generally is a PCB 24 (printed circuit board) on which such components 20 are mounted and connected to each other as required via suitable conducting elements 22. The motherboard 12 described here comprises a top section 26, which extends perpendicular to the axial direction A and in a radial direction R. The top section 26 and the receiver module 14 are stacked in the axial direction A, as illustrated, e.g., in the perspective view of FIG. 2, the side view of FIG. 3, and the exploded view of FIG. 4. As such, the top section 26 comprises two opposing sides, one of which faces the receiver module 14 and the other facing away from the receiver module 14. Components 20 and conducting elements 22 may be mounted on either side.

Figure 2:
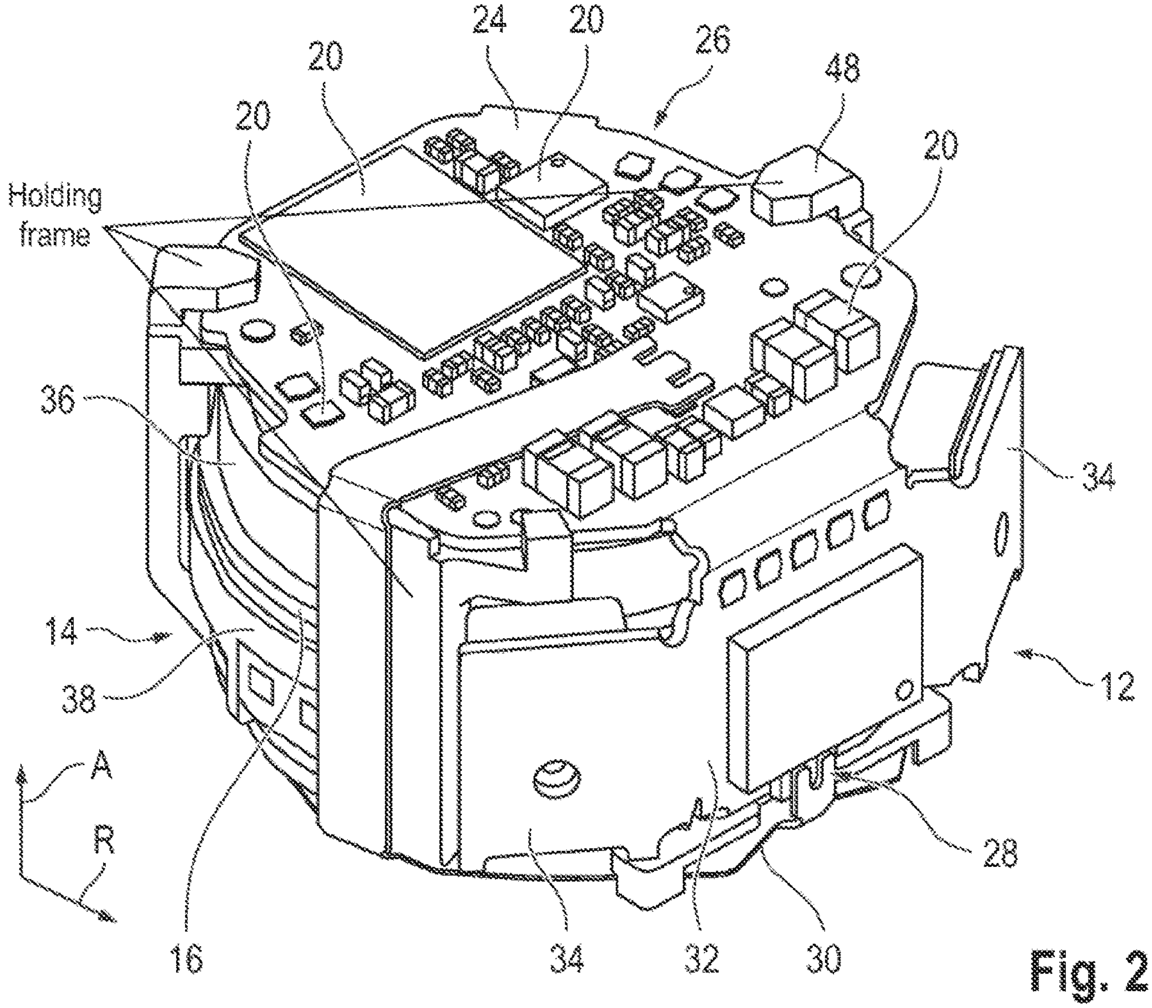
FIG. 2 is a perspective view of a motherboard, a receiver module and a holding frame for the hearing device from FIG. 1.
Figure 3:
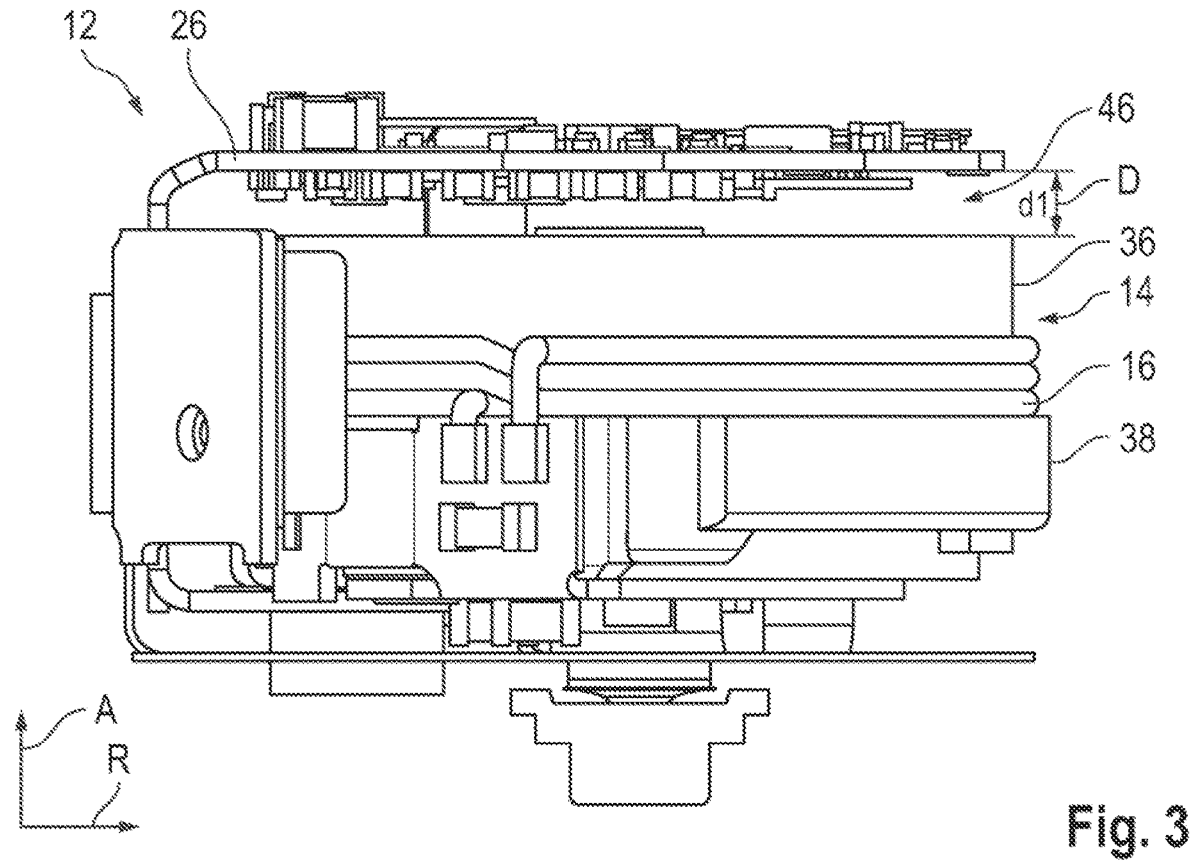
FIG. 3 is a side view of the motherboard and receiver module of FIG. 2.
Figure 9:
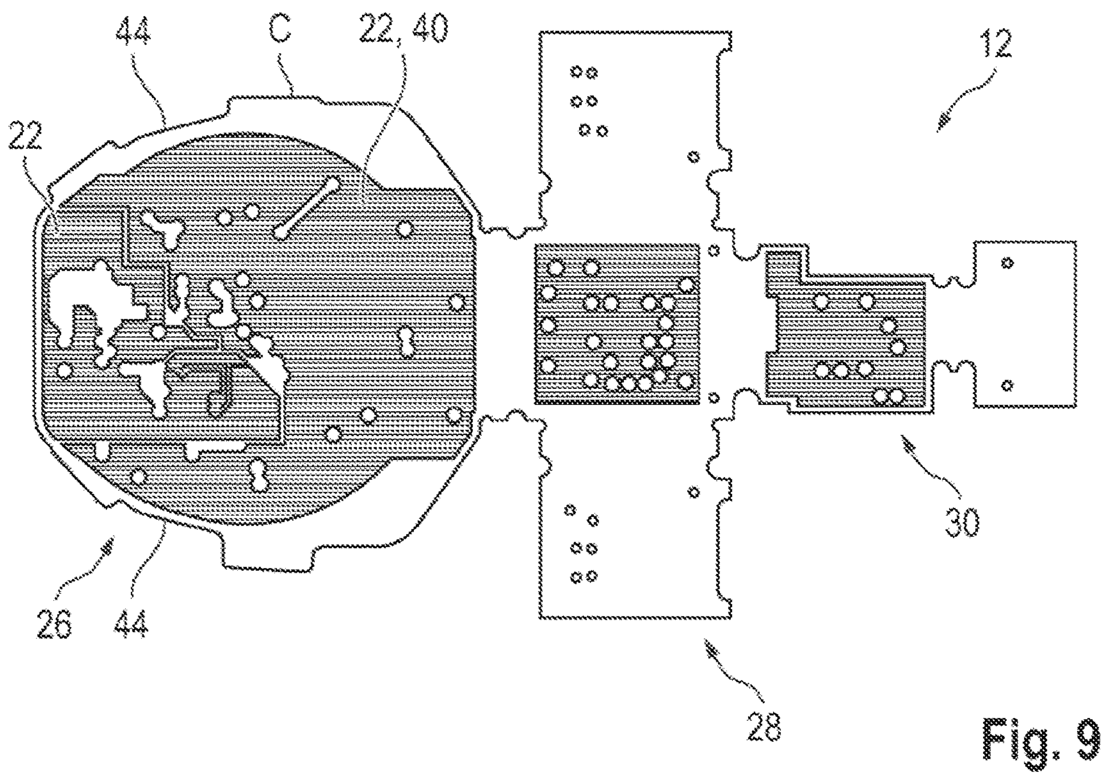
FIG. 9 is a plan view of the motherboard of FIG. 2 and conducting elements thereon.

The motherboard 12 shown here also has a side section 28 connected to the top section 26 and a bottom section 30 connected to the side section 28. As can be seen, e.g., in FIGS. 2 and 3, the motherboard 12 is arranged such that it wraps around the receiver module 14 with said receiver module 14 located between the top section 26 and the bottom section 30. Thus, a sandwiched configuration (as a special case of the stacked configuration) is realized, in which the receiver module 14 is sandwiched between top and bottom sections 26, 30. The side section 28, then, extends in the axial direction A and connects the top and bottom sections 26, 30. The side section 28 optionally has a center section 32, which connects to the top and bottom sections 26, 30, and a number of wings 34 attached to the center section 32 and embracing or folded around the receiver module 14 in a circumferential direction, such that the receiver module 14 is almost encapsulated by the motherboard 12, as illustrated in FIGS. 2 and 3. The motherboard 12 shown in FIG. 2 to 5 is shown in FIG. 9 in an unfolded configuration.

In addition to the coil 16, the receiver module 14 comprises a ferrite 36, for enhancing the magnetic coupling during wireless charging. The coil 16 generally comprises one or several turns, which run around the axial direction A, such that a stack of turns is formed and the coil 16 has a helical shape, extending in the axial direction A, as, e.g., visible in FIGS. 3 and 5. In the example shown here, the turns are circular, such that the coil 16 has the shape of a tube extending in the axial direction A and a radius measured in the radial direction R. The ferrite 36 follows the turns of the coil 16 and, correspondingly, has a tube-like shape. The ferrite 36 is located inside the coil 16, such that the coil 16 runs along an outwards facing surface of the ferrite 36. The ferrite 36 and the coil 16 are positioned and fixed relative to each other with a fixing ring 38. Also, the coil 16 and ferrite 36 are configured such that the battery is located inside of these. The battery generally has a cylindrical shape, with a radius that fits inside the coil 16 and ferrite 38.

The motherboard 12 shown here, more precisely its top section 26, comprises a circumference C, which is designed (here trimmed) such that it at least partially does not extend beyond the ferrite 36 in the radial direction R and does not cover the ferrite 36 when viewed in the axial direction A. This is particularly visible in the top view of FIG. 8. The motherboard 12 has a reduced extension in the radial direction R, which is also visible in FIG. 9, thereby exposing the ferrite 36 when viewed in the axial direction A, which is also, in general, the direction of the magnetic field H. In other words: one or more sections at the border of the motherboard 12 are left out and its circumference C is recessed or trimmed in the radial direction R, to better expose the ferrite 36 to the magnetic field H.

The motherboard 12 also comprises a ground plane 40, which extends over a substantial (i.e., at least 50%) area of the top section 26 and constitutes the main obstacle for the magnetic field H. Hence, this ground plane 40 is designed (here trimmed) such that it at least partially does not extend beyond the ferrite 36 in the radial direction R and does not cover the ferrite 36 when viewed in the axial direction A. The ground plane 40 and its peculiar shape are best visible in FIG. 9.

Figure 6:
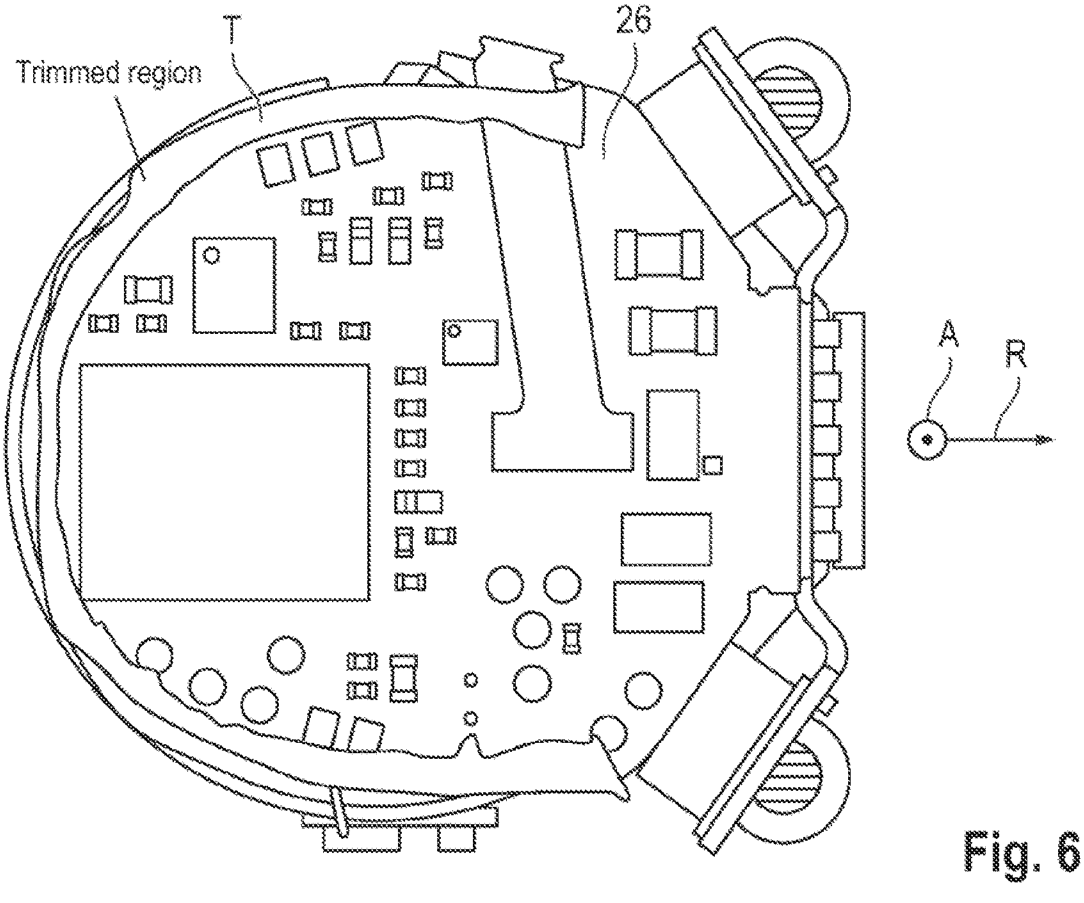
FIG. 6 is a top view of a motherboard and receiver module and a trimming region.
Figure 7:
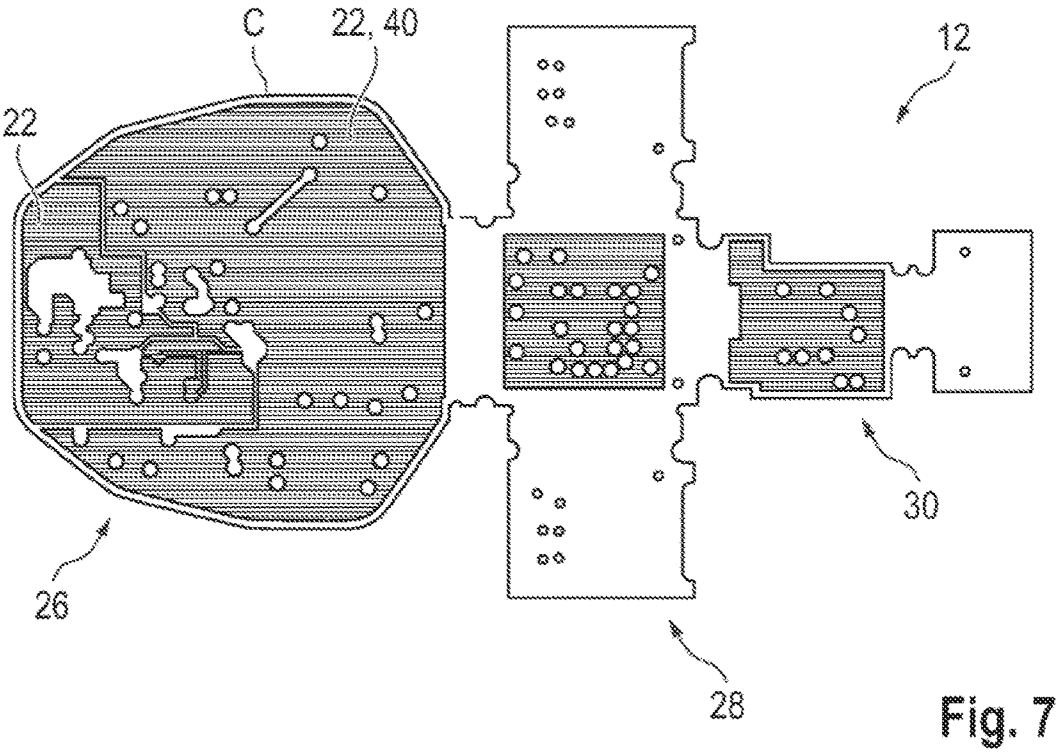
FIG. 7 is a plan view onto a motherboard and conducting elements thereon.
Figure 8:
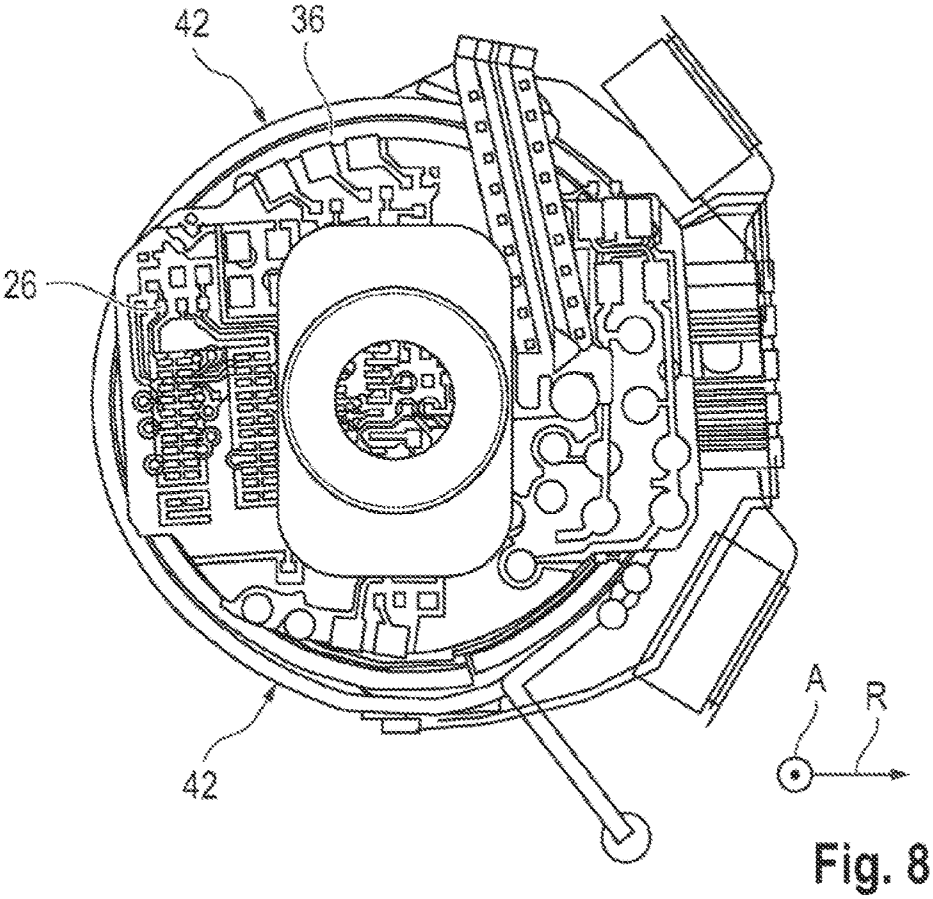
FIG. 8 is a top plan view of the motherboard with trimmed regions and the receiver module from FIG. 2.

When starting from a motherboard 12 or ground plane 40 which entirely covers the ferrite 36, e.g., as shown in FIGS. 6 and 7 for comparison, an embodiment such as in FIGS. 8 and 9 is achieved by trimming the entire motherboard 12 or at least its ground plane 40 in the radial direction R and at the edges (i.e., at the circumference C), preferably as much as possible. In this approach, the motherboard's 12 circumference C and/or ground 40 plane comprises one or more trimmed regions 42, which are recessed (FIGS. 8 and 9) when compared to the original configuration (FIGS. 6 and 7) and which have a reduced extension in the radial direction R. A suitable area for trimming is indicated in FIG. 6 by the trimming region T. These trimmed regions 42 are free of any conducting material and, hence, provide free passage for the magnetic field H. In the example shown here, the circumference C and ground plane 40 are designed such that at least 50% of the ferrite 36 remains uncovered by them when viewed in the axial direction A. Since the ferrite 36 is tube-shaped, the trimmed regions 42 are here arc-shaped. Correspondingly, the circumference C and the ground plane 40 are formed to that each has one or more arc-shaped (also C-shaped) recesses 44 for exposing the ferrite 36 when viewed in the axial direction A.

Figure 10:
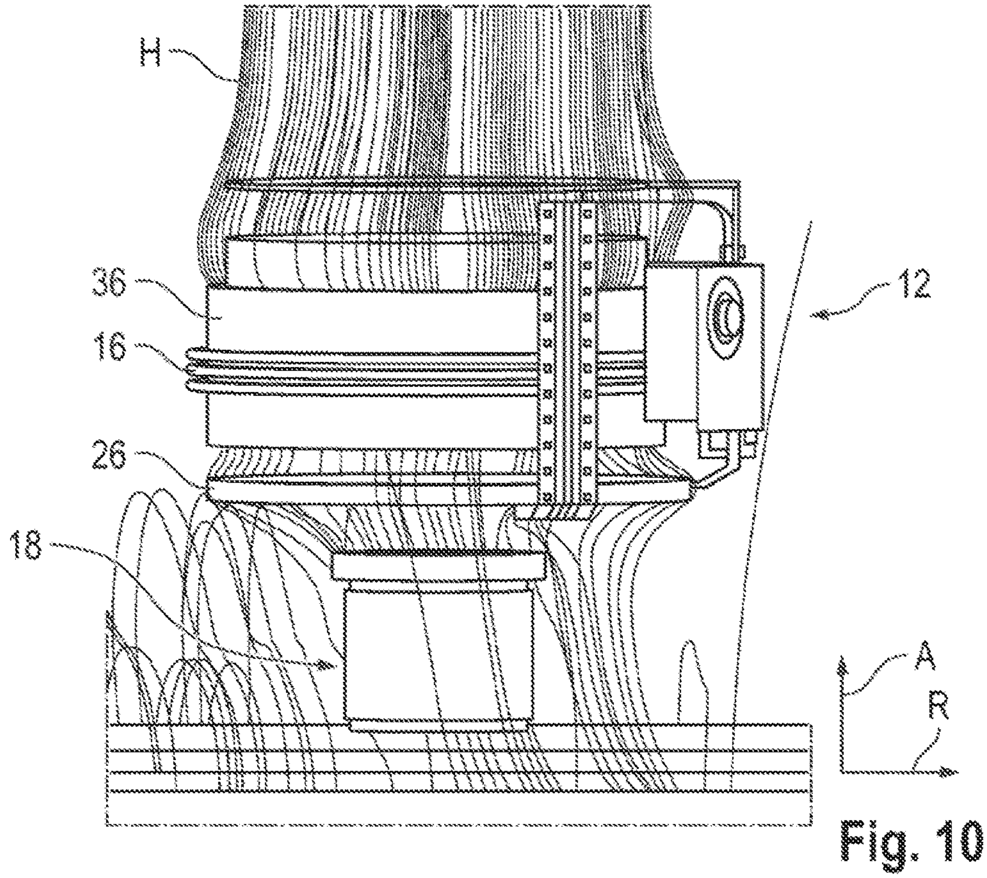
FIG. 10 is a schematic view of a magnetic field simulation for the motherboard and receiver module from FIG. 2 in combination with a transmitter module.
Figure 11:
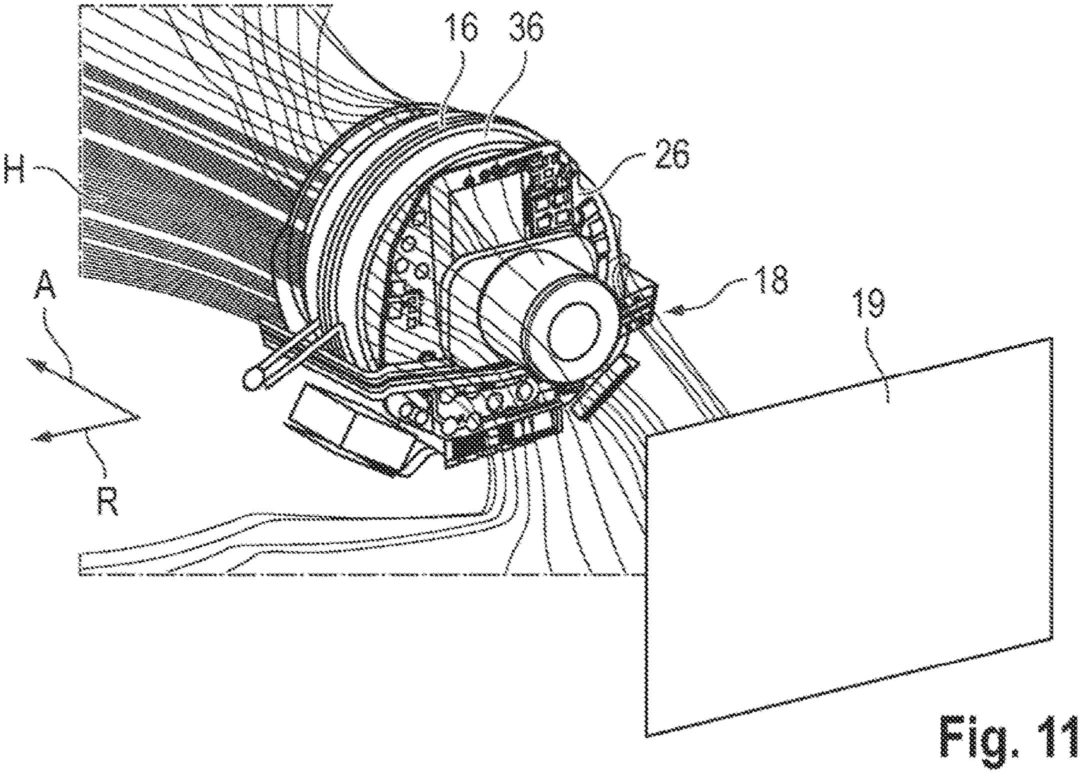
FIG. 11 is another view of the magnetic field simulation from FIG. 10.

FIGS. 10 and 11 show different views of a simulation of the magnetic field H flowing through the ferrite 36 and the coil 16 with the specially trimmed motherboard 12 as shown of FIG. 9 in an assembled hearing device 2 which is charged from a transmitter module 19 via an antenna 18. As shown in FIGS. 10 and 11, the magnetic field H flows around the motherboard 12 while maintaining a high concentration after passing the motherboard 12 and not being blocked off by the motherboard 12.

This is further verified by measurements to compare the performance of a non-trimmed motherboard (as in FIGS. 6 and 7) and a trimmed motherboard 12 (as in FIGS. 8 and 9). The measured performance parameter is based on the inductance value and quality factor. Table 1 below shows the corresponding results. For the non-trimmed motherboard the inductance (L) is reduced by 19.57 nH while the inductance in the case of the trimmed motherboard 12 is only reduced by 13.07 nH after the receiver module 14 is assembled into the hearing device 2. Similarly, the quality factor for the non-trimmed motherboard 12 is reduced by 9.66 as compared to only 8.19 for the trimmed motherboard 12 after assembly.

TABLE 1

| | Receiver module only | | Assembled hearing device | | Difference between receiver module only and assembled hearing device | |
|---|---|---|---|---|---|---|
| Sample | L at 13.56 MHz (nH) | Q at 13.56 MHz | L at 13.56 MHz (nH) | Q at 13.56 MHz | L at 13.56 MHz (nH) | Q at 13.56 MHz |
| Non-trimmed motherboard | 233.66 | 45.69 | 214.09 | 36.03 | −19.57 | −9.66 |
| Trimmed motherboard | 231.89 | 44.51 | 218.82 | 36.32 | −13.07 | −8.19 |

Another measurement is carried out to verify that the shift of resonance frequency after assembly into the hearing device 2 is lower for a trimmed motherboard 12 than for a non-trimmed motherboard 12. The results are shown in Table 2 below. The results show that the resonance frequency shift for the non-trimmed motherboard is 0.478 MHz, while for the trimmed motherboard 12 it is only 0.362 MHz.

TABLE 2

| | Resonance frequency(MHz) | | Shifted |
|---|---|---|---|
| Sample | Pure battery coil module | Assembled Hearing Aid | Resonance frequency(MHZ) |
| Non-trimmed copper trace motherboard | 13.184 | 13.662 | 0.478 |
| Trimmed copper trace motherboard | 13.186 | 13.548 | 0.362 |

In addition, a simulation is carried out to study the coupling factor between the receiver module 14 of the hearing device 2 and transmitter module 19 of the charger and the coil-to-coil efficiency. The comparison samples are a hearing device 2 with a non-trimmed motherboard 12 a hearing device 2 with a trimmed motherboard 12. The simulation is conducted with a distance of 2 mm and 7 mm measured from top of the antenna to the bottom of the receiver module 14. The coupling factor and efficiency results are shown in table 3 below. For magnetic resonance wireless charging, a higher coupling factor means the coil-to-coil efficiency is larger, which will result in higher overall charging efficiency. The 2 mm distance shows a higher coupling factor and higher coil-to-coil efficiency than the 7 mm distance. The non-trimmed motherboard has a lower coupling factor and a lower coil-to-coil efficiency compared to the trimmed motherboard 12.

TABLE 3

| | Distance | | | |
|---|---|---|---|---|
| | 2 mm | | 7 mm | |
| | Measurement | | | |
| | Coupling factor | Coil-to-coil efficiency | Coupling factor | Coil-to-coil efficiency |
| Non-trimmed copper trace motherboard | 0.0360 | 43.3 | 0.0317 | 39.7 |
| Trimmed copper trace motherboard | 0.0391 | 47.3 | 0.0344 | 42.7 |

In general, a gap 46 is formed between the motherboard's 12 top section 26 and the receiver module 14, the gap 46 usually spanning a spacing distance D on the order of 0.5 mm to 1 mm in the axial direction A (in an analogous manner, a corresponding gap and distance are formed between the bottom section 30 and the receiver module 14). This gap 46 and distance D may vary. Hence, in the embodiment shown here, a resonance frequency tolerance control is implemented by introducing a holding frame 48 to guarantee as little variation of the gap 46 and distance D as possible. The holding frame 48 holds the motherboard 12 and the receiver module 14 and fixes them relative to each other. This is shown particularly well in FIG. 5. In this particular example, wireless charging does not occur through the faceplate, but from the other side, i.e., from above in FIG. 5, which is the side on which the top section 26 is located.

Figure 4:
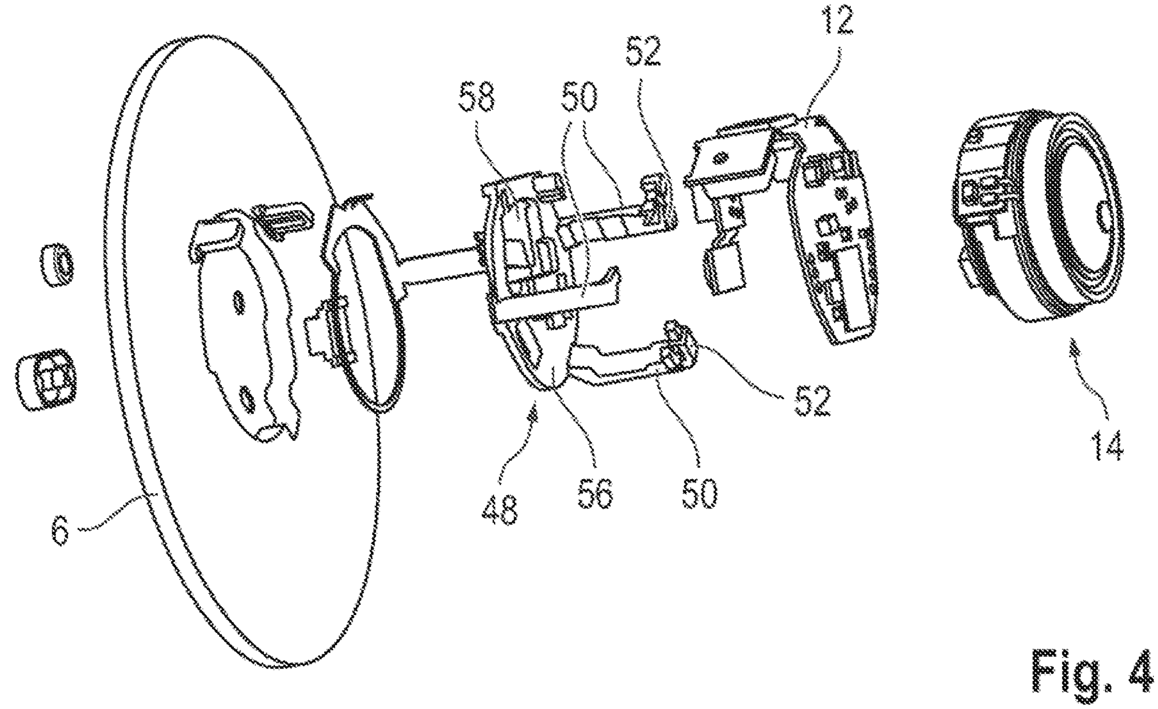
FIG. 4 is an exploded view of some components of the hearing device from FIG. 1.
Figure 5:
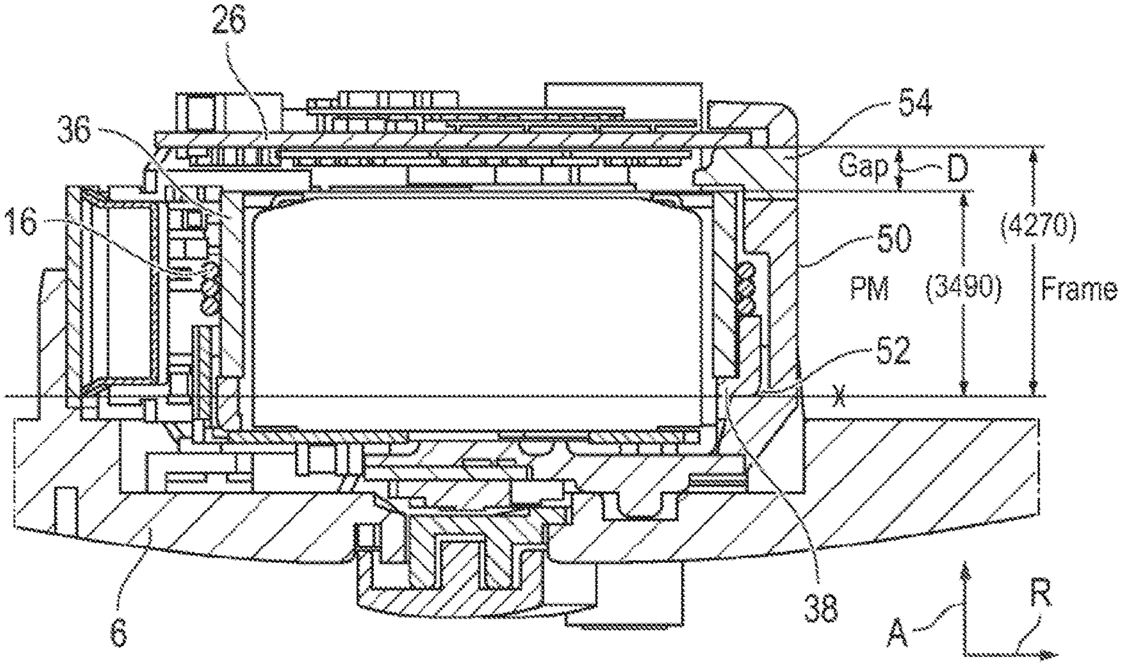
FIG. 5 is a sectional view of some components of the hearing device from FIG. 1.

The holding frame 48 is also visible in the exploded view of FIG. 4. The holding frame 48 shown here has several brackets 50 extending in the axial direction A, wherein each bracket 50 has a shoulder 52 in which the receiver module 14 rests and an arm 54 on which the motherboard 12 rests, as visible in FIG. 5. The brackets 50 are connected to each other via a plate 56 and surround and grab the receiver module 14. The motherboard 12 is placed on top of this, such that the gap 46 between the receiver module 14 and the motherboard 12 is defined by the positions of the arms 54. The shoulders 52 are facing inwards and are formed as recesses on an inside of each bracket 50. The arms 54 extend into the radial direction R and inwards, such that they extend over the coil 16 and ferrite 36.

The holding frame 48, receiver module 14 and motherboard 12 shown here are designed such that during assembly the receiver module 14 (and battery) are inserted sideways between the motherboard's 12 top and bottom section 26, 30 to achieve a stacked configuration and this combination of motherboard 12 and receiver module 14 is inserted into the holding frame 46 in the axial direction A, such that the shoulders 52 and arms 54 of the brackets 50 act as a limit stop to the axial insertion and, hence, fix the motherboard 12 and receiver module 14 in a defined and precise way.

The plate 56, which is connected to each of the brackets 50, extends in the radial direction R and is stacked with the receiver module 14 and the motherboard's 12 top and bottom sections 26, 30 in the axial direction A. The plate 56 has a roughly circular shape and is formed with one or more cut-outs 58 to accommodate parts of the motherboard 12 and/or to allow access to the motherboard 12. The plate 56 is located at the bottom and, hence, close to the motherboard's 12 bottom section 30.

The holding frame 48 keeps the spacing distance D between the receiver module 14 and the motherboard 12 at a fixed value with a particularly small tolerance. In other words: the holding frame 48 is designed such that the gap 46 is set to a fixed distance D (measured in the axial direction A) within a tolerance of at most 0.15 mm. In the exemplary embodiment shown here, the tolerance is the sum of a first tolerance for resting the receiver module 14 on the shoulders 52 and a second tolerance for resting the motherboard 12 on the arms 54.

Figure 12:
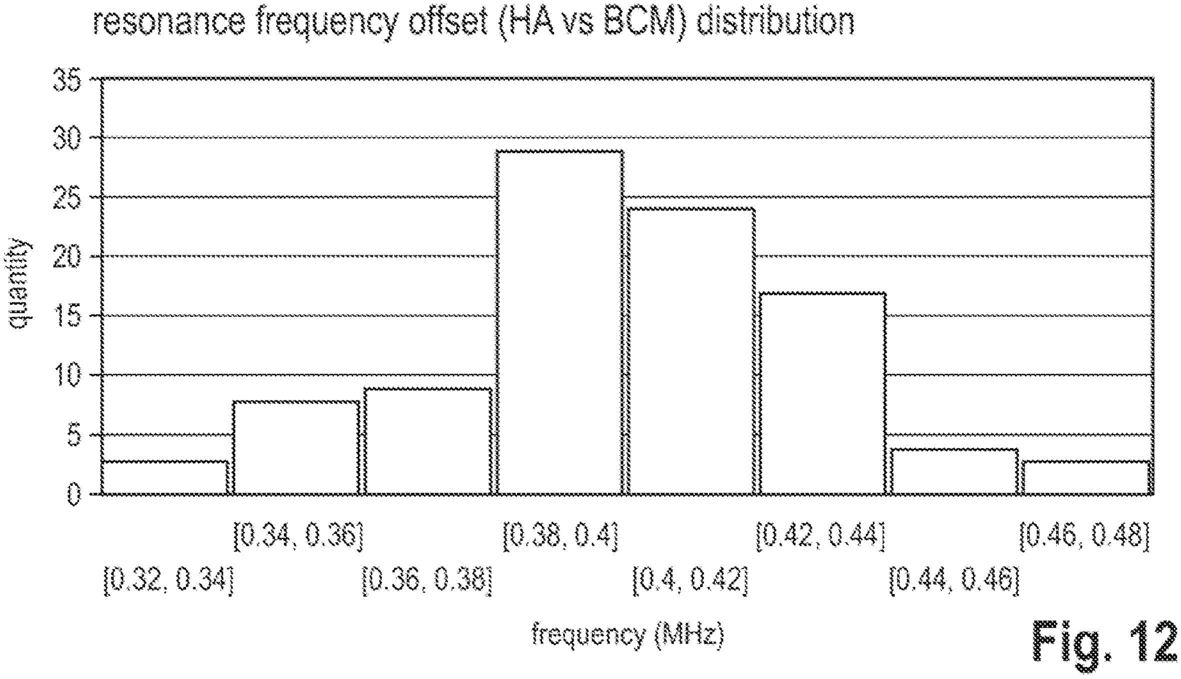
FIG. 12 is a chart of the distribution of the resonance frequency shift after assembly.

Measurements are carried out to verify the impact of the holding frame 48 on the resonance frequency shift after assembling the receiver module 14 into the hearing device 2. The resonance frequency of the receiver module 14 is measured for 100 hearing devices 2 before and after assembly and the difference is calculated to obtain the resonance frequency shift between these two conditions. The results are shown in FIG. 12, showing the distribution resonance frequency shift caused by the assembly for 100 hearing devices 2. The results show a range of 0.32 MHz to 0.48 MHz for the resonance frequency shift, with the majority of values in a range of 0.38 MHz to 0.44 MHz. For an exemplary target resonance frequency of the assembled hearing device 2 of 13.56 MHz, the resonance frequency is kept within a range of 13.08 MHz to 13.24 MHz.

Another feature of the holding frame 48 is to reduce any variation of the resonance frequency in the assembled hearing device 2 upon the impact of an external force, such as a drop to the floor. To verify this, table 4 lists results from a corresponding drop test from 1 m above ground with four assembled hearing devices 2. Table 4 shows the measured resonance frequency before (pre-test) and after (post-test)

the drop. The results show that the resonance frequency difference between pre-test and post-test does not vary more than the 0.06 MHz.

| Sample | Resonance Frequency (MHz) | |
|---|---|---|
| | Pre-test | Post-test |
| 1 | 13.65 | 13.64 |
| 2 | 13.656 | 13.646 |
| 3 | 13.62 | 13.592 |
| 4 | 13.628 | 13.574 |

The following is a summary list of reference numerals and the corresponding structure used in the above description of the invention:

2 hearing device
4 shell
6 face plate
8 sound outlet
10 sound inlet
12 motherboard
14 receiver module, battery module
16 coil
18 antenna
19 transmitter module
20 component
22 conducting element
24 PCB
26 top section
28 side section
30 bottom section
32 center section
34 wing
36 ferrite
38 fixing ring
40 ground plane
42 trimmed region
44 recess
46 gap
48 holding frame
50 bracket
52 shoulder
54 arm
56 plate
58 cut-out
A axial direction
C circumference
D spacing distance
H magnetic field
R radial direction
T trimming region

The invention claimed is:

1. A hearing device, comprising:
a receiver module configured for wireless charging of a battery, said receiver module comprising a ferrite and having a coil running around an axial direction;
a motherboard having a top section extending perpendicular to the axial direction and in a radial direction; and
said top section and said receiver module being stacked in the axial direction; and
said motherboard having a circumference formed such that said motherboard, at least partially, does not extend beyond the ferrite in the radial direction and/or does not cover the ferrite when viewed in the axial direction.

2. The hearing device according to claim 1, wherein:
said motherboard has a side section connected to said top section and a bottom section connected to said side section; and
said motherboard being arranged to wrap around said receiver module with said receiver module being disposed between said top section and said bottom section.

3. The hearing device according to claim 1, wherein the circumference is formed to leave uncovered at least 50% of the ferrite when viewed in the axial direction.

4. The hearing device according to claim 1 wherein the circumference is formed with one or more arc-shaped recesses for exposing the ferrite when viewed in the axial direction.

5. A hearing device, comprising:
a receiver module configured for wireless charging of a battery, said receiver module comprising a ferrite and having a coil running around an axial direction;
a motherboard having a top section extending perpendicular to the axial direction and in a radial direction; and
said top section and said receiver module being stacked in the axial direction; and
said motherboard comprising a ground plane formed such that said ground plane, at least partially, does not extend beyond the ferrite in the radial direction and/or does not cover the ferrite when viewed in the axial direction.

6. The hearing device according to claim 5, wherein the ground plane is formed to leave uncovered at least 50% of the ferrite when viewed in the axial direction.

7. The hearing device according to claim 5, wherein the ground plane is formed with one or more arc-shaped recesses for exposing the ferrite when viewed in the axial direction.

8. The hearing device according to claim 1, further comprising a holding frame holding said motherboard and said receiver module and fixing said motherboard and said receiver module relative to one another.

9. The hearing device according to claim 8, wherein:
said holding frame has a plurality of brackets extending in the axial direction; and
each of said brackets has a shoulder in which said receiver module rests and an arm on which said motherboard rests.

10. The hearing device according to claim 9, wherein:
said holding frame comprises a plate connected to each of said brackets; and
said plate extends in the radial direction and is stacked with said receiver module and said top section of said motherboard in the axial direction.

11. The hearing device according to claim 8, wherein:
said top section of said motherboard and said receiver module are disposed with a gap in between; and
said holding frame is configured to set said gap at a fixed spacing distance within a tolerance of at most 0.15 mm.

12. The hearing device according to claim 1, further comprising a customized shell encasing said motherboard and said receiver and formed to worn in a given user's ear canal.

13. The hearing device according to claim 1, being an in-the-ear hearing aid or a completely-in-the-canal hearing air.

14. A hearing device, comprising:
a receiver module configured for wireless charging of a battery, said receiver module having a coil running around an axial direction;

a motherboard having a top section extending perpendicular to the axial direction and in a radial direction; and said top section and said receiver module being stacked in the axial direction; and a holding frame holding said motherboard and said receiver module and fixing said motherboard and said receiver module relative to one another.

* * * * *